No. 725,286. PATENTED APR. 14, 1903.
H. J. POWELL & O. H. SCHNEIDER.
CAR BRAKE.
APPLICATION FILED FEB. 18, 1903.
NO MODEL.
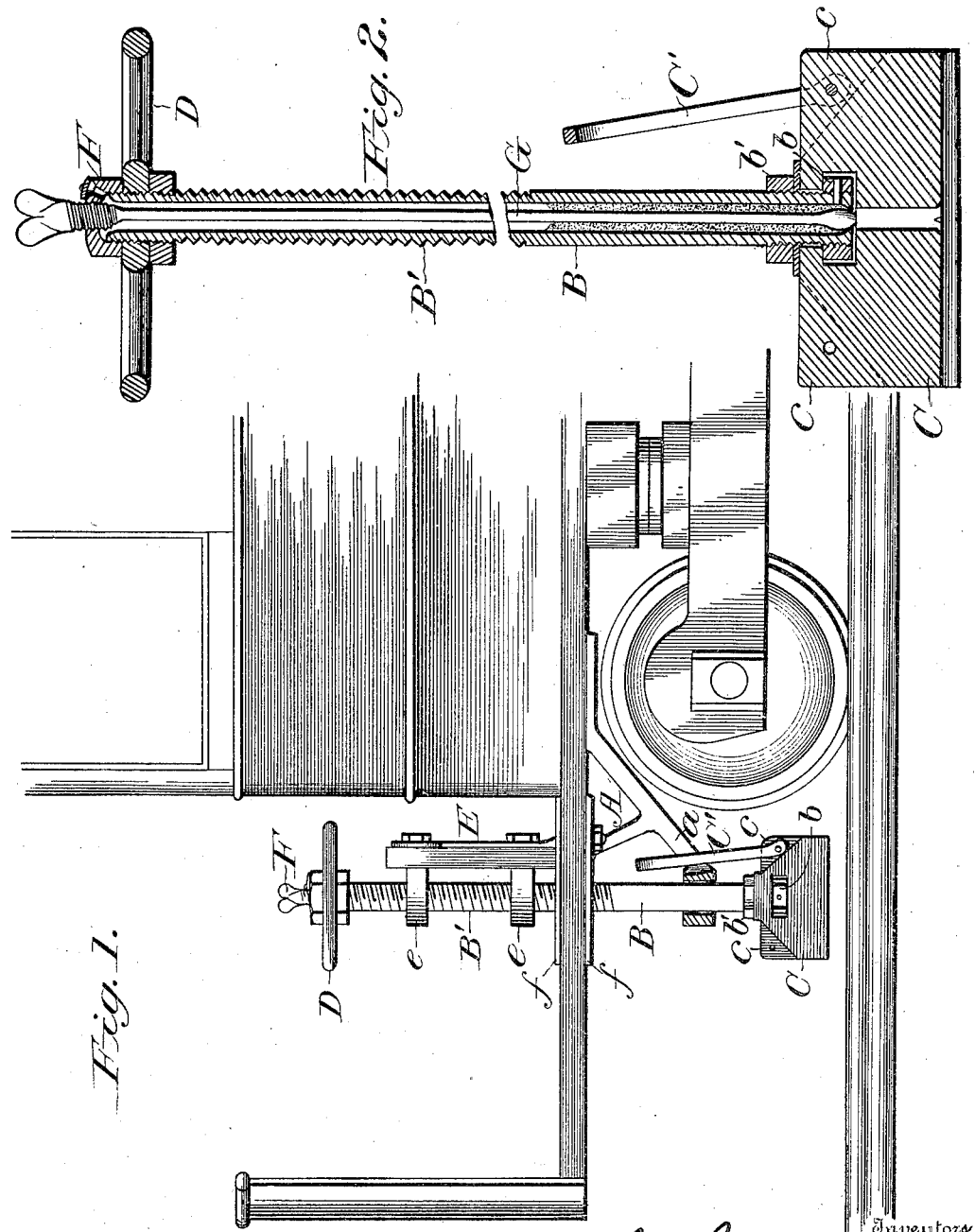

UNITED STATES PATENT OFFICE.

HENRY J. POWELL AND OSCAR H. SCHNEIDER, OF FROSTBURG, MARYLAND.

CAR-BRAKE.

SPECIFICATION forming part of Letters Patent No. 725,286, dated April 14, 1903.

Application filed February 18, 1903. Serial No. 143,925. (No model.)

*To all whom it may concern:*

Be it known that we, HENRY J. POWELL and OSCAR H. SCHNEIDER, citizens of the United States, residing at Frostburg, in the county of Allegany and State of Maryland, have invented new and useful Improvements in Car-Brakes, of which the following is a specification.

This invention appertains to improvements in brakes for cars, the object being to provide a rail-brake constructed so that the brake carrying and actuating bar serves as a receptacle for sand or other material which it is desired to place on the rails, the bar having a cut-off positioned within the bar for controlling the flow of material through the brake-shoe and upon the rail.

A further object of the invention is to provide a brake-shoe the construction thereof being such that it may be turned or reversed on its support, also to generally improve the construction of this type of car-brakes.

The invention consists in the construction and combination of the parts, as will be hereinafter set forth, and specifically pointed out in the claims.

In the accompanying drawings, which illustrate one embodiment of the invention, Figure 1 is a side elevation of a portion of a car, showing the rail-brake applied thereto; and Fig. 2 is a vertical section of the movable parts of the brake.

The invention is applied to the frame of a car at any suitable point above the rails, and when applied to a car there is provided on the under side in front of the wheels a rigid frame A, having an angular depending member $a$, the lower end thereof being provided with an annular opening for the passage therethrough of a hollow bar B, which carries at its lower end a brake-shoe C, the upper end of the hollow bar having rigidly attached thereto a hand-wheel D. The lower end of the hollow bar is externally threaded to receive nuts $b\ b'$, which engage with the threaded end, the lower nut $b$ being locked to the bar. Internally the end of the bar is contracted to provide a seat for a bulb or enlargement on the lower end of a cut-off which is movable longitudinally to open or close the lower end of the hollow rod.

The brake-shoe C is constructed to receive the lower end of the hollow bar B, the same being rotatively connected to the shoe by the nut $b$, which is locked on the bar. The shoe and bar are connected so that the shoe can be turned end for end upon the bar to which it is attached, and the upper sides are cut away to provide centrally-located webs $c\ c$, which are apertured for the passage of bolts, one of the bolts engaging the perforated ends of a bail C', which straddles an inclined portion of the frame A and limits or prevents the shoe turning with the bar B. The bail also limits the vertical movement of the bar by engaging the under side of a plate attached to the car or with the lower portion of the frame A when the shoe is lowered to engage a rail. When one end of the shoe becomes worn, the shoe may be reversed by removing the bail, turning the shoe, and attaching the bail to the other end.

The hollow bar or tube B has external threads B', cut or formed with a rather quick pitch, and these threads engage threaded apertures through blocks $e\ e$, attached to a standard E or other equivalent support. When such a standard as has been illustrated is used, plates $f\ f$ may be attached to the frame of the car, and the bar and strap attached to the standard will be passed through openings in said plates. When the hand-wheel D is turned, it will move therewith the hollow bar, raising or lowering the same and moving therewith the brake-shoe.

The upper end of the tube or hollow bar B is chamfered on its inner side and carries a cap F, having centrally a threaded aperture and to one side thereof an opening which leads to the interior of the hollow bar. The upper end of the longitudinally-movable cut-off rod G is constructed so that the rod may be readily turned and when turned will place or remove the enlarged lower end from the seat provided therefor.

The bar B is of such length and diameter as to contain a sufficient quantity of sand which when discharged upon the rail will prevent the brake-shoe slipping thereon when the rails are wet, icy, or in such condition that sand is necessary. In winter the bar or tube B may be filled with salt, which can be fed upon the rails to clear the same of snow or ice.

In a car-brake constructed as shown it is optional with the operator to use the contents of the hollow brake-bar, and when sand or salt is used it is conveyed directly upon the rail through the center opening of the shoe, and the bottom portion of the shoe may be concave transversely to fit snugly upon the rails and prevent sidewise escape of sand.

Rail-brakes constructed substantially as shown may be used in conjunction with the usual wheel-brakes, and a car may be provided with either two or four of the track-brakes.

The manner of supporting and attaching the hollow bar may be varied to accord with the construction of the car and point where it is attached.

Having thus described our invention, what we claim as new, and desire to secure by Letters Patent, is—

1. As an improvement in car-brakes, the combination of a shoe having an opening therethrough, a hollow bar connected to the shoe, and means for closing the lower end of the hollow bar, substantially as shown.

2. As an improvement in car-brakes, the combination of a hollow and vertically-movable bar, a shoe movable vertically therewith, means for holding the shoe against a rotative movement, and a cut-off movable vertically within the hollow bar, for the purpose set forth.

3. As an improvement in car-brakes, the combination of a rail-engaging shoe, a hollow bar rotatively connected therewith, supporting means for the bar, a hand-wheel rigidly attached to the bar, and an independent movable cut-off carried by the hollow bar, substantially as shown.

4. As an improvement in car-brakes, the combination of a brake-shoe having a centrally-located aperture therethrough, a bail attached to the shoe, a frame having a depending portion which is straddled by the bail, a bar externally threaded and provided with a hand-wheel, a standard having blocks which project therefrom and are threaded to be engaged by the bar attached to the brake-shoe, substantially as shown and for the purpose set forth.

5. As an improvement in car-brakes, the combination of a brake-shoe having centrally-positioned webs, a bail pivoted to one of the webs and straddling a frame to hold the bail against turning, a vertically-movable bar rotatively attached to the shoe, and supports for the bar, substantially as shown.

In testimony whereof we have hereunto set our hands in presence of two subscribing witnesses.

HENRY J. POWELL.
    OSCAR H. SCHNEIDER.

Witnesses:
 EDWARD DAVIS,
 JOHN J. FOSTER.